3,666,433
MOLD HOLDER WITH THERMOSTATICALLY
CONTROLLED MOLD
Hermann H. Nebelung, Binz-Maur, and Eginhard Jaeger, Weiningen, Switzerland, assignors to Emhart Corporation, Bloomfield, Conn.
Filed July 8, 1970, Ser. No. 53,172
Int. Cl. C03b 9/34
U.S. Cl. 65—158
5 Claims

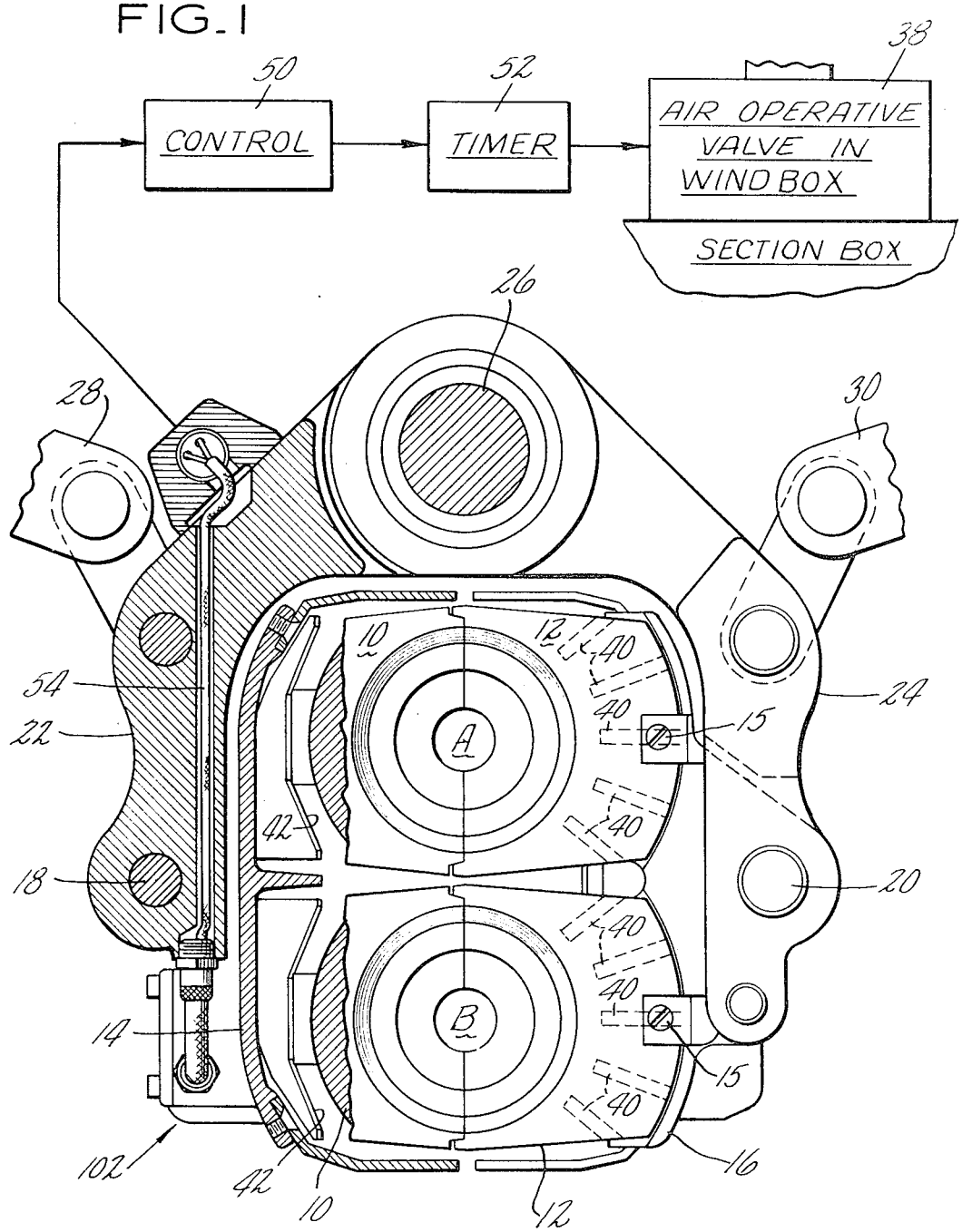

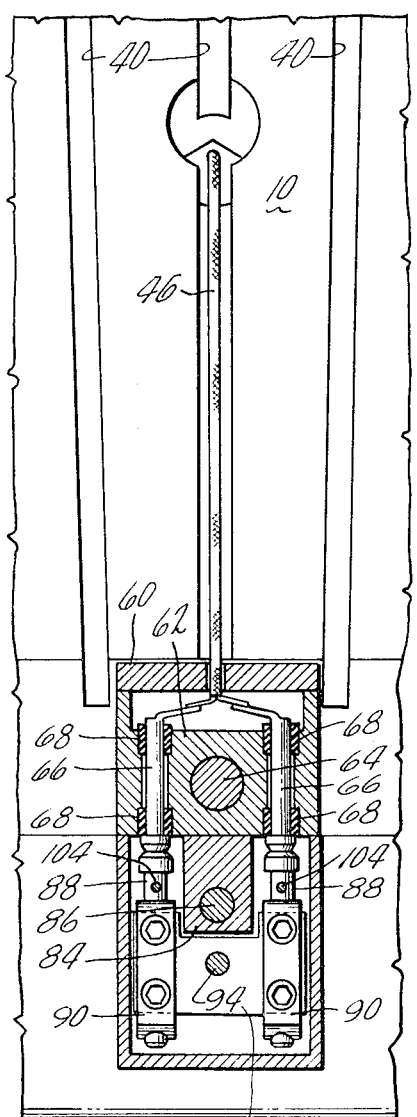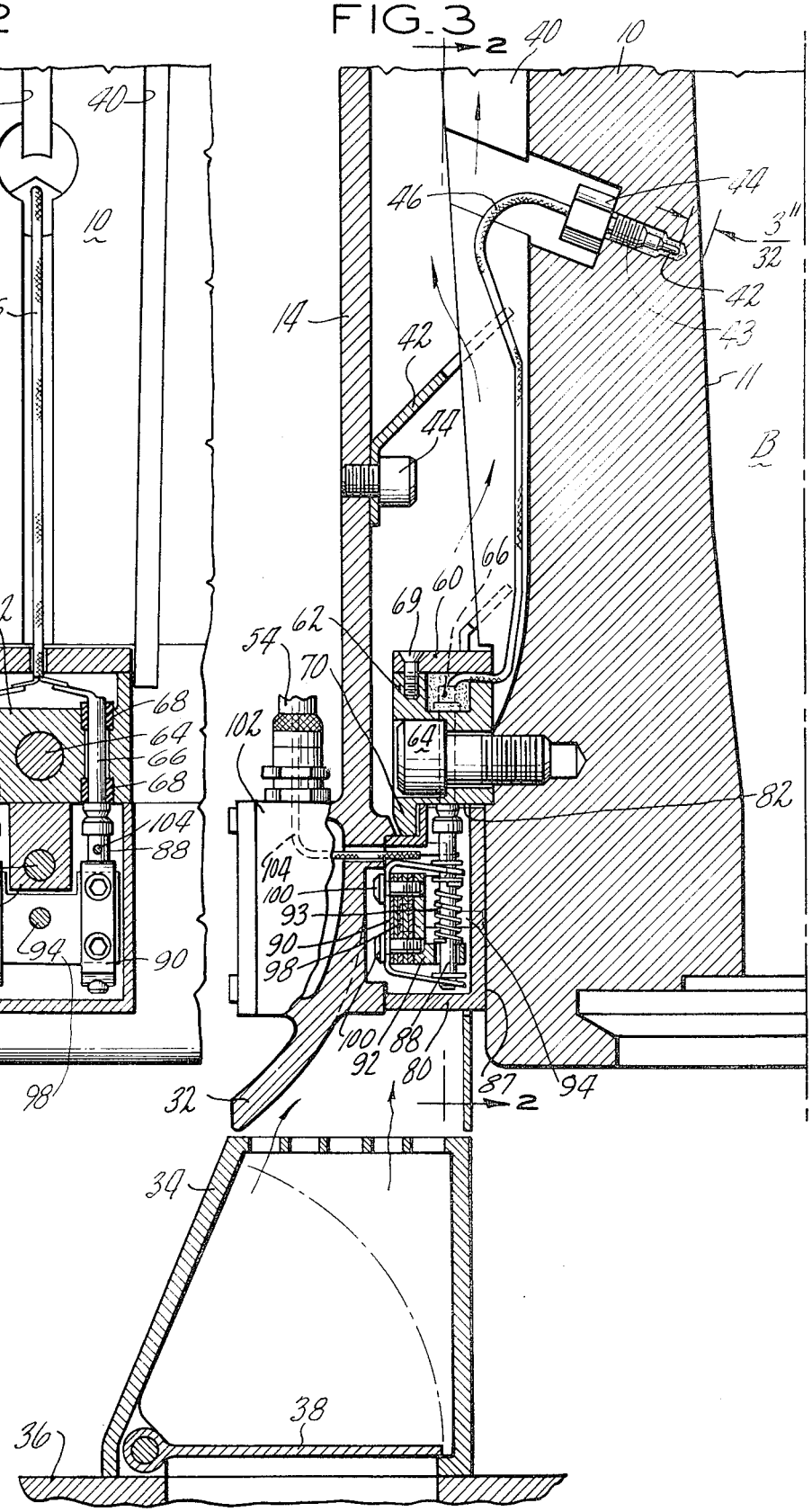

ABSTRACT OF THE DISCLOSURE

In a glassware forming machine of the Hartford I.S. type, a split blank mold is provided wtih a thermocouple type temperature sensor and the mold carries a lead-out wire and a plug part which mates with a complementary plug part and leadout wire on the mold holder to provide a signal for a control system. The plug parts not only locate one another during assembly, but also help locate the mold in the holder. The mold is air cooled and the control system includes a damper valve for controlling the flow of cooling air in response to the output of the thermocouple, and also in accordance with the closing movement of the mold holders.

BACKGROUND OF THE INVENTION

In glassware forming machines the blank and the blow molds are usually of the split type, with both mold sections supported on mold holders which move from and to closed positions associated with plungers or the like for pressing or blowing the molten glass in the mold. The mold holders generally comprise a pair of pivotally mounted arms cantilevered from a common hinge pin and the split mold halves or sections are removably mounted on the mold holder arms so as to mate with one another to define one or more cavities when the arms are moved inwardly to their closed positions. In setting up the glassware forming machine for forming different types of glassware, the operator must of course remove and replace these split mold sections, and, therefore, the manner in which they are supported on the arms must be kept quite simple and straight-forward in order to avoid excessive downtime of the machine during this set-up procedure. One very common design device for so supporting a mold section is shown in U.S. Pat. No. 2,485,836 issued to MacConnell in 1949. As shown, the mold section is provided with upper lugs which engage cooperating ribs on the mold holder, and a lower locating surface is provided on the holder for engaging the side of the mold to support it in an upright position on the holder. This patent also shows a holder which cooperates with the mold to define a chamber therebetween, through which chamber cooling air can be directed for cooling the mold. It will be apparent that the mold halves can be conveniently removed and replaced without disrupting this air cooling capability, but it will also be apparent that no temperature control is provided in this installation.

U.S. Pat. No. 3,285,728 issued to Torok in 1966 shows a blank or parison mold in which the pressing plunger itself comprises a water cooled, thermostatically controlled mold member. However, the plunger itself is not in contact with the molten glass for a sufficient length of time to achieve worthwhile results in a plunger cooled system. The traditional concept of an air cooled split mold is more satisfactory, but requires solving the practical problem of controlling mold temperature in spite of opening and closing of the mold halves, and of the need for removal and replacement thereof.

In mold cooling generally the ultimate aim is to control the mold temperature in the area of the mold cavity. This aim has been one which is usually pursued empirically by the machine operator as a result of the appearance of the product itself. For example, if the blank mold gets too hot it will fail to extract the proper amount of heat from the molten glass during formation of the parison, with the result that the parison will not congeal quite enough prior to being transferred to the blow mold station, and will deform due to sagging as the transfer takes place. On the other hand, should an excessively cold blank mold extract too much heat, the parison may cool too quickly on its outer surface causing the checks or other evidence of uneven cooling in the relatively thick walled parison.

U.S. Pat. No. 3,494,199 issued to Stacey in 1970 shows a straight forward approach to recording the mold temperature, but this data is not much more reliable than the empirical approach mentioned.

The heat extracted from the product depends basically on the difference in temperature between the mold and the product and upon the duration of contact. Duration is determined primarily by the production rate and cannot be varied for present purposes. The gob temperature of glass delivered to the mold is set by viscosity requirements. Therefore, from simple heat transfer relationships. it will be apparent that the heat etxracted can be seen to depend primarily upon mold temperature.

The present invention seeks to provide a practical means for not only continually monitoring mold temperature to determine whether it is in a safe operating range, but also to provide means for controlling the temperature of the mold in response to this temperature monitoring function, and to accomplish these ends without undue sacrifice to the practical problem faced by the machine oeprator who must remove and replace blank and blow molds periodically to set the machine up for production runs of glassware of different size and shape.

SUMMARY OF THE INVENTION

This invention relates to mold cooling apparatus for use in glassware forming machines and deals more particularly with a mold holder and thermostatically controlled mold therefor.

In the embodiment of the invention described herein a split blank mold is provided with a thermocouple generally intermediate the upper and lower ends of one mold half section, and with the temperature sensitive portion thereof as close as possible to the mold cavity itself. The lead-out wires for the thermocouple terminate in a unique plug which together with the thermocouple and the mold section comprise a unit which may be conveniently removed and replaced when a new production run is to be set up. A complementary plug receptacle is provided on the mold holder which receives this mold section, or others like it and it is an important feature of the present invention that these plug parts include complementary locating flanges on each, for not only aligning the mold with the holder but for aligning the plug parts as well. The plug part in the mold holder has a lead-out wire associated with it, and a control system is provided for operating a damper valve in the wind box portion of the machine to direct cooling air upwardly as required between the exterior of the mold and the interior of the mold holder, at least when the latter is closed.

BRIEF DESCRIPTION OF THE DRAWINGS

FIG. 1 is a plan view partly in horizontal section of a pair of mold holders and their associated split mold halves in their closed positions, showing the thermocouple lead-out wires in one of the mold holder arms, and includes a schematic representation of the control mechanism for the damper valve in the wind box.

FIG. 2 is a sectional view taken generally on the line 2—2 of FIG. 3.

FIG. 3 is a vertical sectional view through the outer split mold half shown in FIG. 1, and also shows the mold holder in relationship to the glassware machines.

DETAILED DESCRIPTION

Turning now to the drawings in greater detail, FIG. 1 shows in somewhat schematic fashion the blank mold side of a double gob Hartford I.S. type glassware forming machine, the split mold halves being shown in their closed positions so as to define a pair of blank mold cavities indicated generally at A and B. Each such mold cavity is defined by a pair of opposed mold halves or sections 10 and 12 mounted respectively on mold holders 14 and 16 respectively. The mold sections 12, 12 are loosely held in place on the holder 16 in a conventional manner by step blocks 13, 13 and screws 15, 15. The mold holders 14 and 16 are in turn pivotally mounted on pins 18 and 20 respectively, which pins are in turn carried on a pair of conventional mold holder arms 22 and 24 respectively. The mold holder arms 22 and 24 are pivotally mounted on a common hinge pin 26 provided for this purpose in the fixed frame of the machine (not shown) and said mold holder arms 22 and 24 are adapted to be moved between the closed positions shown to open positions wherein the arms are swung away from one another by suitable linkage indicated generally at 28 and 30. Means is provided in the glassware forming machine for sequentially pivoting the mold holder arms in timed relationship with operation of other components of the machine so as to periodically form a parison from a charge of molten glass delivered to the blank mold cavities A and B. The operation of the mold holder arms and of the various other components of the machine is adequately described in the patent to Ingle, 1,911,119, and need not be described in detail herein.

FIG. 3 shows in vertical section the configuration of the left-hand outer blank mold section. This mold section 10 is mounted upon the mold holder 14 for operation in the manner described above. As shown in this view, the mold holder 14 includes an outwardly flared skirt portion at its lower end, as indicated generally at 32, and it will also be apparent that the holder is so constructed and arranged with respect to the mold section 10 that said holder in cooperation with the exterior surface of the split mold 10 defines a space or chamber therebetween into which cooling air can be passed from a wind box 34 provided for this purpose on the section box 36 of the glassware forming machine. The wind box 34 is of conventional construction and includes a damper valve 38 for controlling the flow of air from the section box 36 upwardly through the perforated upper wall of the wind box 34 for cooling of the mold 10. As is conventional practice, the exterior surface of the mold half 10 preferably defines a series of vertically extending grooves 40, 40 for increasing the effective cooling of said blank mold by the air from the wind box 34. This cooling air is exhausted through a suitable opening defined at the upper end of the mold (not shown) as is conventional practice. A baffle 42 may be provided in the chamber defined between the mold holder 14 and the exterior surface of the blank mold section 10 for directing the flow of cooling air inwardly against the blank mold and into these grooves 40, 40 at some particular vertical location on the mold. As shown, the baffle plate 42 is mounted to the interior side wall of the mold holder 14 by a screw as indicated generally at 44.

In accordance with the presently preferred embodiment of this invention, means is provided for thermostatically controlling the temperature of the blank mold, and particularly its temperature at a point intermediate the upper and lower ends of the blank mold half 10 adjacent the surface of the cavity defining inner wall 11 of the blank mold so as to accomplish the objects stated above for this invention. A thermocouple and more particularly the hot end 42 is encased in a sheath to which is fitted an annular screw or barrel 43 which is threadably received in a threaded opening provided for this purpose in the blank mold 10. The hot end 42 of the thermocouple is submerged in a small reservoir of liquid solder defined inwardly of the threaded barrel portion, and is preferably located within one-fourth of an inch from the inner wall 11 of the blank mold 10. The threaded barrel portion 43 also includes an outer portion 44 which defines a nut to allow the thermocouple to be inserted in this position, and a suitable access opening is provided adjacent one of the grooves 40 in the side wall of the blank mold 10 for inserting or removing the thermocouple hot end 42. The hot end of the thermocouple is shown in the drawings as located 3/32 of an inch from the interior cavity wall of the blank mold and the thermocouple lead-out wire 46 comprises the usual matched pair of wires in the thermocouple so as to provide a first signal which is ultimately provided at the control device, indicated generally at 50 in FIG. 1. The device 50 operates in conjunction with a timer 52 so as to provide a second signal for operating the valve 38 in the wind box 34 to meter the flow of air upwardly between the blow holder 14 and the exterior surface of the blank mold 10.

Still with reference to FIG. 1, lead-out wire means, indicated generally at 54, is provided in the mold holder arm 22 and plug means is provided between the mold holder 14 and the blank mold 10 for transferring the first signal from the lead-out wire means 46 associated with the blank mold 10 to the lead-out means 54 associated with the mold holder arm 22.

Turning now to a more complete description of the means for electrically connecting the lead-out wire means 46 associated with the mold 10, and the lead-out wire means 54 associated with the mold holder arm 22, FIG. 3 shows in vertical the mold and in part on the holder for accomplishing the foregoing purpose. The mold mounted plug part 60 comprises a block of steel or the like 62 which defines a central opening for receiving a screw 64, and the screw 64 is threadably received in an opening provided for this purpose in the blank mold 10. As best shown in FIG. 2, a pair of contact posts 66, 66 are provided in vertically extending openings in the block 62 with annular insulators 68, 68 being provided to insulate these posts from the metal block 62. The mold associated lead-out wire means 46 comprises a pair of dissimilar conductors, each of which is joined to one of these contact posts 66 in a small chamber defined by an opening provided for this purpose in the block 62 and a top or cover plate is held to the block by a plurality of screws 69, 69.

The mold associated plug part 60 has a lower portion which defines a depending flange 70 located in spaced relationship to the associated exterior wall surface of the mold 10 so as to define a recess therebetween into which the lower end portions of the contact posts 66, 66 protrude. Thus, the thermocouple 42, its associated lead-out wire means 46 and an associated plug part 60 are permanently mounted to the mold half 10 and will be removed integrally with the mold when the machine operator is setting up his machine for the fabrication of glassware of different size, or of different shape.

A complementary plug part 80 is carried by the mold holder 14 and has an upper portion adapted to receive the mold mounted plug part and to locate the same so as to provide an electrical connection between these plug parts. The plug part 80 comprises a hollow housing of rectangular configuration in which a pair of spring biased contact pins are urged upwardly so as to engage the lower end portions of the posts 66, 66 in the mold associated plug part 60. This rectangular housing includes an upper portion which projects into the recess defined by the mold associated plug part 60 and the blank mold 10. This upwardly projecting portion of the housing 80 cooperates with the mold holder 14 to define a recess for receiving the depending flange 70 as best shown in FIG. 3. The housing 80 of the holder associated plug part includes a central depending portion 84 which defines an opening for receiving a mounting screw 86, and the mounting screw 86 supports the holder associated plug part 80 to the lower portion of the holder 14. The inner surface 87 of the housing 80 is adapted to engage the outer surface of the mold 10 for supporting and locating said mold while at the same time the upwardly projecting portion 82 of the hollow housing 80 in conjunction with the holder 14 defines a recess for receiving the depending flange 70 of the mold associated plug part 60 to locate the latter.

As mentioned above, a pair of vertically oriented contact pins 88, 88 are movably mounted in the holder associated plug part 80 for limited vertical movement so that their upper ends are adapted to engage the lower ends of the posts 66, 66 respectively. Biasing means is provided for urging the contact pins 88, 88 in an upward direction for causing this engagement. Preferably, said biasing means includes a pair of U-shaped spring clips 90, 90 each of which has aligned openings adjacent the end portions of its respective legs to receive one of said contact pins 88. Each contact pin is mechanically connected to the spring clip legs by means of a pair of washer elements carried on each of the contact pins for achieving the above-mentioned biasing effect. Means is provided for supporting these U-shaped spring clips, and as shown in FIG. 3, said means comprises mounting screws 100, 100 and a generally rectangular member 98 having a central opening for receiving a mounting screw 94, which screw extends inwardly between the contact pins 88, 88 and is threadably received in the rear wall 87 of the housing 80 so as to support the spring clips and hence to movably support the contact pins 88, 88 in the manner just described. The member 98 is preferably made from an insulating material such as Teflon and carries two generally L-shaped brackets 92, 92 which include an enlarged opening for loosely receiving each contact pin 88. A coil compression spring 93 is also provided between the lower leg of each L-shaped bracket 92 and one of the above-mentioned washers attached to the contact pin 88 for urging the pin upwardly. Thus, the effect of the U-shaped spring clip 90 and its associated compression spring 93 is an additive one in that each cooperates with the other to urge the contact pin 88 upwardly into engagement with the lower end portion of one of the posts 66, 66. It will be apparent that as so constructed the U-shaped spring clips 90, 90 are insulated from one another and from the housing 80.

The mold holder 14 also includes a second small housing indicated generally at 102 for receiving the lead-out wire means 54 associated with the mold holder arm, and for protecting that portion of said lead-out wire means which is connected to each of the vertically movable contact pins 88, 88. As indicated schematically at 104 means is provided for electrically connecting the lead-out wire 54 to these contact pins 88, 88. Although not shown, a terminal strip is preferably provided in the housing 102 for allowing this connection to be easily disassembled and reassembled. For present purposes, however, it is sufficient to note that the exposed inner end portion of each conductor 14 is soldered in a small opening defined for this purpose in each of the vertically movable contact pins 88, 88. Thus, as these pins move up and down in the removal and replacement of the mold and its associated plug part 60, it will be apparent that the conductors 104 will be adapted to flex slightly cantilever fashion to accommodate this slight movement.

While the operation of the above-described apparatus will be apparent from the preceding description, the following brief description is offered by way of summary. Cooling air can be directed upwardly from the wind box 34 into the space provided for this purpose between the mold holder 14 and the mold 10 at least when the mold holder arms 22 and 24 have been moved to their closed positions as shown in FIG. 1. A timer 52 is provided for precluding opening of the damper valve 38 except when the mold is in its closed position. A conventional thermocouple is provided in the mold 10 but has a unique means for extracting the signal from the mold to operate a control device 50 which in turn operates the damper valve 38 to control the flow of cooling air in order to maintain the mold at a predetermined temperature. The lead-out wires associated with the thermocouple pass through novel plug means provided in part on the mold and in part on the mold holder so that these plug parts serve to locate the mold in the holder as well as to provide an electrical connection therebetween. Further, these plug parts are so designed that the removal and replacement of a particular mold can be easily accomplished with a minimum downtime to the machine itself. More particularly, the mold associated plug part 60 has a depending flange 70 which is received in a recess defined by the interior wall of the mold holder 14 and a projecting portion 82 of the holder associated plug part 80. So too, this projecting portion 82 fits into a recess defined between the flange 70 and the base of the mold section 10.

The plug part 80 is hollow and a pair of movable contact pins 88, 88 are biased upwardly into this projecting portion 82 to engage the lower ends of fixed posts 66, 66 to provide a continuous electrical connection between the thermocouple itself and the control device 50 whenever the mold section 10 is mounted in the holder 14.

We claim:

1. In a glassware forming machine having a mold holder mounted in the machine frame for movement toward and away from a glass molding position wherein said holder is located adjacent a source of cooling air, a mold supported on said holder and having means for directing cooling air generally upwardly between said mold and said mold holder, in said molding position, the improvement comprising temperature sensing means in said mold, lead-out wire means for said temperature sensing means and including a plug part mounted in said mold, a complementary plug part carried by said holder for receiving said mold mounted plug part, said plug parts being so shaped as to locate said mold in said holder as well as to provide an electrical connection between said plug parts, and lead-out wire means carried by said mold holder for providing an electric signal indicative of mold temperature at a location remote from the mold itself.

2. The combination set forth in claim 1 wherein each of said lead-out wire means comprises two conductors, and wherein said mold mounted plug part includes a depending flange which is spaced outwardly from the base of the mold and wherein said mold mounted plug part further includes a pair of upright posts having their upper ends electrically connected to said conductors and having their lower ends depending into the recess defined between said depending flange and the mold base.

3. The combination set forth in claim 2 wherein said plug part carried by said mold holder has an upwardly projecting portion which fits into said recess, and which projecting portion cooperates with said mold holder to define a recess for receiving said depending flange on said mold mounted plug part.

4. The combination set forth in claim 2 wherein said plug part carried by said mold holder includes a pair of contact pins movably mounted in said plug part for limited vertical movement so that the upper ends thereof are adapted to engage the lower ends of said posts, respectively, and biasing means for urging said contact pins upwardly.

5. The combination set forth in claim 4 and further characterized by leaf spring means for resiliently supporting said pins, said leaf spring means having parallel legs with aligned openings adjacent the end portions of its respective legs to receive one of said contact pins, said contact pins being mechanically connected to said resilient legs for movement therewith, said plug part carried by said mold holder having insulating means for supporting said leaf spring means, and said lead wires being electrically connected to said contact pins independently of said spring clips.

References Cited

UNITED STATES PATENTS

| | | | |
|---|---|---|---|
| 3,244,497 | 4/1966 | Copeland | 65—162 |
| 3,551,127 | 12/1970 | Stoll | 65—162 X |

ARTHUR D. KELLOGG, Primary Examiner

U.S. Cl. X.R.

65—162, 360